(12) United States Patent
Goda

(10) Patent No.: US 9,307,104 B2
(45) Date of Patent: Apr. 5, 2016

(54) INFORMATION PROCESSING APPARATUS, METHOD FOR CONTROLLING THE SAME, AND STORAGE MEDIUM

(75) Inventor: Junichi Goda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 574 days.

(21) Appl. No.: 13/225,283

(22) Filed: Sep. 2, 2011

(65) Prior Publication Data

US 2012/0062945 A1 Mar. 15, 2012

(30) Foreign Application Priority Data

Sep. 10, 2010 (JP) .................. 2010-203336

(51) Int. Cl.
*G06F 3/12* (2006.01)
*H04N 1/00* (2006.01)

(52) U.S. Cl.
CPC ....... *H04N 1/00413* (2013.01); *H04N 1/00222* (2013.01); *H04N 2201/0094* (2013.01)

(58) Field of Classification Search
CPC .......... H04N 1/00413; H04N 1/00222; H04N 2201/0094; G06F 3/12; G06F 3/048
USPC ................................. 358/1.15, 1.1
See application file for complete search history.

(56) References Cited

U.S. PATENT DOCUMENTS

| 8,223,358 B2* | 7/2012 | Czyszczewski et al. ..... 358/1.15 |
| 2006/0077423 A1* | 4/2006 | Mathieson et al. ......... 358/1.15 |
| 2010/0053676 A1* | 3/2010 | Sugimoto .................. 358/1.15 |
| 2010/0149592 A1* | 6/2010 | Yoshida .................... 358/1.15 |

FOREIGN PATENT DOCUMENTS

| CN | 101163287 A | 4/2008 |
| JP | 2002-094722 A | 3/2002 |
| JP | 2002-259071 A | 9/2002 |
| JP | 2006-127503 A | 5/2006 |
| JP | 2006-202017 A | 8/2006 |
| JP | 2006-203869 A | 8/2006 |
| JP | 2006-277527 A | 10/2006 |
| JP | 2007-112141 A | 5/2007 |
| JP | 2007-323366 A | 12/2007 |
| JP | 2010-057009 A | 3/2010 |

* cited by examiner

*Primary Examiner* — Iriana Cruz
(74) *Attorney, Agent, or Firm* — Canon USA Inc. IP Division

(57) ABSTRACT

Provided is an information processing apparatus that, whichever of a web application and a native application is being executed when a specific hard key is operated, make uniform a function executed by operating the hard key. When processing is executed by communicating with the web application on a web server, and the operation is performed by the hard key included in the information processing apparatus, the web server is notified of identification information for identifying the hard key, and an operation screen is displayed based on screen information received from the web server that has been notified of the identification information.

4 Claims, 17 Drawing Sheets

FIG.5

500 HARD KEY TABLE

| HARD KEY TYPE (501) | KEY ID (502) |
|---|---|
| WEB APPLICATION | web_app |
| COPY | copy |
| PAGE INTEGRATION | Nin1 |
| SORT | sort |
| MAGNIFY | mag |
| BOTH SIDES | both side |
| SCAN | scan |
| RETURN | return |
| AUTHENTICATION | ninsho |
| RESET | reset |
| 1 | no1 |
| 2 | no2 |
| . | . |
| . | . |
| . | . |

FIG.15A

*1500* HARD KEY TABLE

| HARD KEY TYPE /1501 | KEY ID /1502 | |
|---|---|---|
| WEB APPLICATION | web_app | |
| COPY | copy | |
| PAGE INTEGRATION | Nin1 | |
| SORT | sort | |
| MAGNIFY | mag | |
| BOTH SIDES | both side | |
| SCAN | scan | |
| FAX | fax | ⎫ |
| ADDRESS BOOK | address | ⎪ |
| REDIAL | redial | ⎬ FAX FUNCTION RELATIONSHIP |
| SHORTEN | short_dial | ⎪ |
| PAUSE | pause | ⎪ |
| ON-HOOK | onfook | ⎭ |
| . | . | |
| . | . | |
| . | . | |
| RETURN | return | |
| RESET | reset | |
| 1 | no1 | |
| 2 | no2 | |
| . | . | |
| . | . | |
| . | . | |

FIG.15B

*1510* HARD KEY TABLE

| *1511* HARD KEY TYPE | *1512* KEY ID | |
|---|---|---|
| WEB APPLICATION | web_app | ⎫ COMMON FUNCTION RELATIONSHIP |
| COPY | copy | |
| PAGE INTEGRATION | Nin1 | |
| SORT | sort | |
| MAGNIFY | mag | |
| BOTH SIDES | both side | |
| SCAN | scan | ⎫ FAX FUNCTION RELATIONSHIP |
| FAX | fax | |
| ADDRESS BOOK | address | |
| REDIAL | redial | |
| SHORTEN | short_dial | |
| PAUSE | pause | |
| ON-HOOK | onfook | |
| . | . | ⎫ COMMON FUNCTION RELATIONSHIP |
| . | . | |
| . | . | |
| RETURN | return | |
| RESET | reset | ⎫ AUTHENTICATION FUNCTION RELATIONSHIP |
| AUTHENTICATION | ninsho | |
| 1 | no1 | ⎫ COMMON FUNCTION RELATIONSHIP |
| 2 | no2 | |
| . | . | |
| . | . | |
| . | . | |

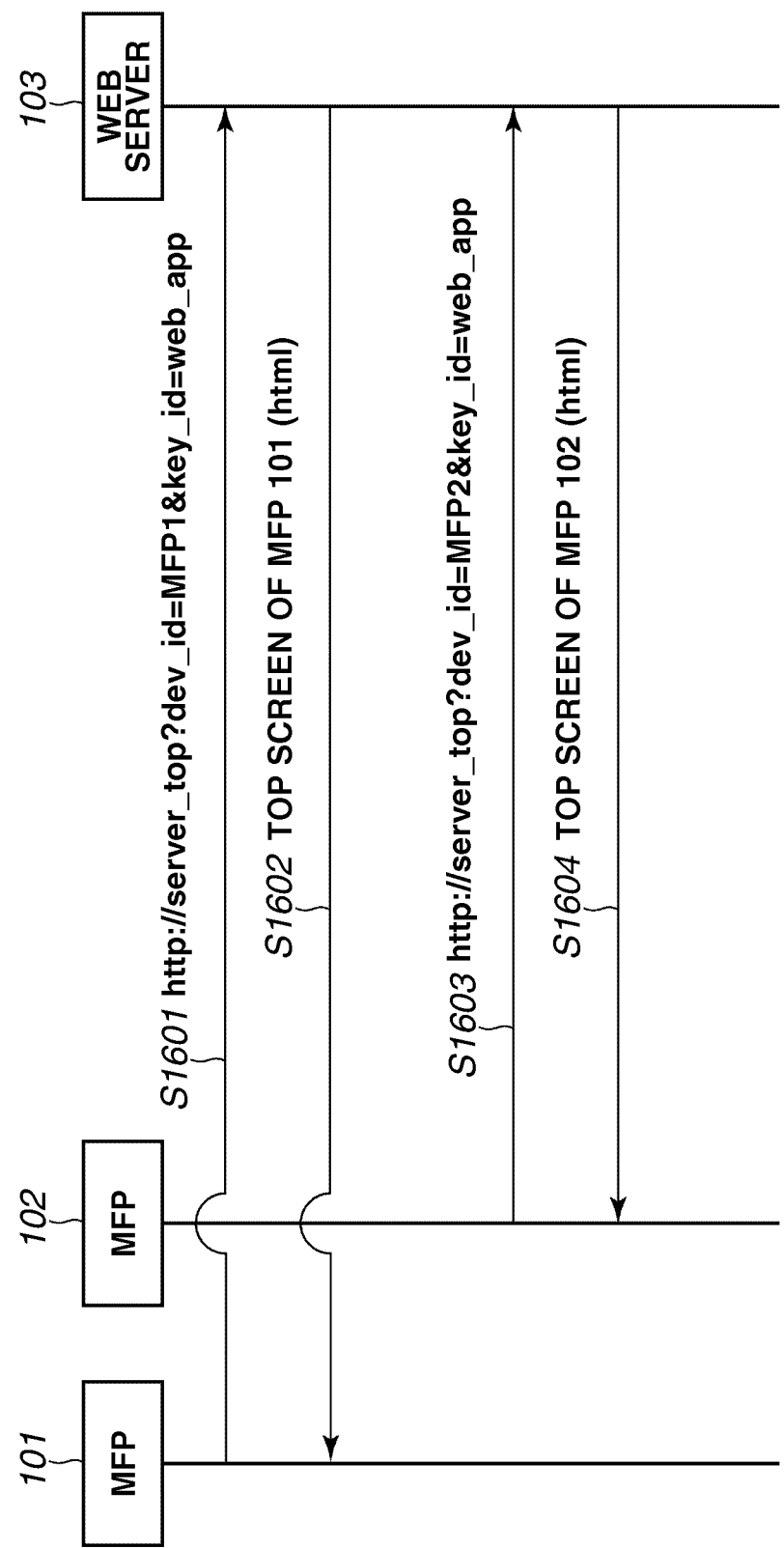

INFORMATION PROCESSING APPARATUS, METHOD FOR CONTROLLING THE SAME, AND STORAGE MEDIUM

BACKGROUND OF THE INVENTION

1. Field of the Invention

The present invention relates to an information processing apparatus, a method for controlling the same, and a storage medium.

2. Description of the Related Art

The conventional art has provided a technology that connects an information processing apparatus such as a multifunction peripheral (MFP) to a web server on a network, and displays an operation screen supplied from the web server on a web browser (as discussed in Japanese Patent Application Laid-Open No. 2006-127503).

According to the technology discussed in Japanese Patent Application Laid-Open No. 2006-127503, the web server provides the operation screen for inputting an instruction to use each function of the MFP. In other words, a user of the MFP inputs an instruction for the MFP via the operation screen displayed on the web browser. The web browser then notifies the web server of the input instruction.

The web server that has received the notification requests the MFP to execute processing according to contents of the instruction input by the user. Then, the MFP that has received the request executes the processing as requested. This configuration eliminates the necessity of storing, in the MFP, all menu data to operate the MFP, and the menu data can be easily changed on the web server.

Thus, according to the technology discussed in Japanese Patent Application Laid-Open No. 2006-127503, the web server uniformly supplies screen information to display a menu screen to operate the MFP. Accordingly, all the MFPs can display a common menu screen.

In some of the information processing apparatuses such as MFPs, the web server supplies some of applications while for other applications, a program stored in the MFP is read to be executed (hereinafter, the application supplied by the web server is referred to as a "web application", and the application executed based on information stored in the MFP in advance is referred to as a "native application").

However, in the conventional art, for operations by hardware keys (hereinafter, "hard keys") included in the MFP, similar operability cannot be set between the native application and the web application. It is because the web application can be operated on the operation screen displayed on the web browser but cannot be operated by the hard keys included in the MFP.

SUMMARY OF THE INVENTION

The present invention is directed to an information processing apparatus that, whichever of a first operation mode and a second operation mode is set when an execution button to use a specific function is operated, can make uniform the function executed by operating the execution button.

According to an aspect of the present invention, an information processing apparatus capable of communicating with an external apparatus includes a display unit configured to display an operation screen, and an execution button operated by a user to use a specific function included in the information processing apparatus, wherein the display unit displays, if the execution button is operated and a first operation mode is set, an operation screen for using the specific function based on screen information received from the external apparatus, and displays, if the execution button is operated and a second operation mode is set, the operation screen for using the specific function without receiving the screen information from the external apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates a configuration of a hard key table included in the MFP or a web server according to the first exemplary embodiment of the present invention.

FIGS. 15A and 15B each illustrates a configuration of a hard key table included in the MFP or a web server according to the second exemplary embodiment of the present invention.

FIG. 16 illustrates a processing sequence when an MFP and hard keys included in the MFP are operated according to a third exemplary embodiment of the present invention.

DESCRIPTION OF THE EMBODIMENTS

Various exemplary embodiments, features, and aspects of the invention will be described in detail below with reference to the drawings.

However, the exemplary embodiments are in no way limitative of the scope of claims of the present invention, and all the combinations of features of the exemplary embodiments are not essential to solution of the invention.

A first exemplary embodiment of the present invention is described below. According to the first exemplary embodiment, when a user operates a hard key of an MFP, a web server is notified of the operation of the hard key. The web server generates appropriate screen information according to a type of the notified hard key to transmit it to the MFP.

Figure 1:
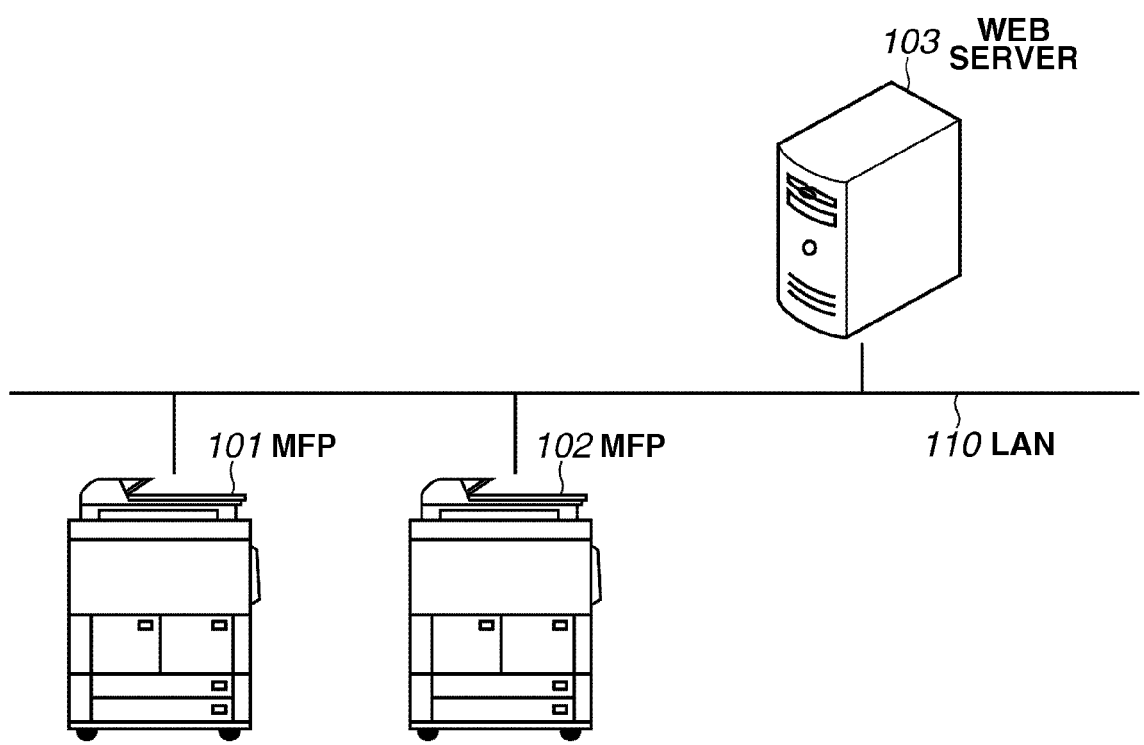
FIG. 1 illustrates an entire information processing system according to the present invention.

FIG. 1 illustrates an entire information processing system according to the first exemplary embodiment. A web server 103, an MFP 101, and an MFP 102 are connected through a local area network (LAN) 110 to be able to communicate with each other. The MFP 101, the MFP 102, and the web server 103 can be connected not only through the LAN but also through any other connection methods such as Internet or wireless communication.

An information processing apparatus is described by taking an example of an MFP. However, not limited to the MFP, the information processing apparatus according to the present invention can be a single function peripheral (SFP) such as a scanner or a printer. The information processing apparatus can be a personal computer (PC) or a mobile phone. In the present exemplary embodiment, the MFP 102 is similar in configuration and function to the MFP 101, and thus description thereof is omitted. An external apparatus is described by taking an example of a web server. However, not limited to the web server, the external apparatus according to the present invention can be another MFP or PC having a web function.

In the present exemplary embodiment, the MFP 101 includes a native application. The web server 103 includes a web application. Normally, the MFP 101 executes processing using its own native application. However, the MFP 101 communicates with the web server when needed, and can execute processing using the web application. In the present exemplary embodiment, the execution of processing using the native application is defined as a native mode, and the execution of processing using the web application is defined as a web mode. In the present exemplary embodiment, the MFP 101 and the MFP 102 execute processing in one of the native mode and the web mode.

Figure 2:
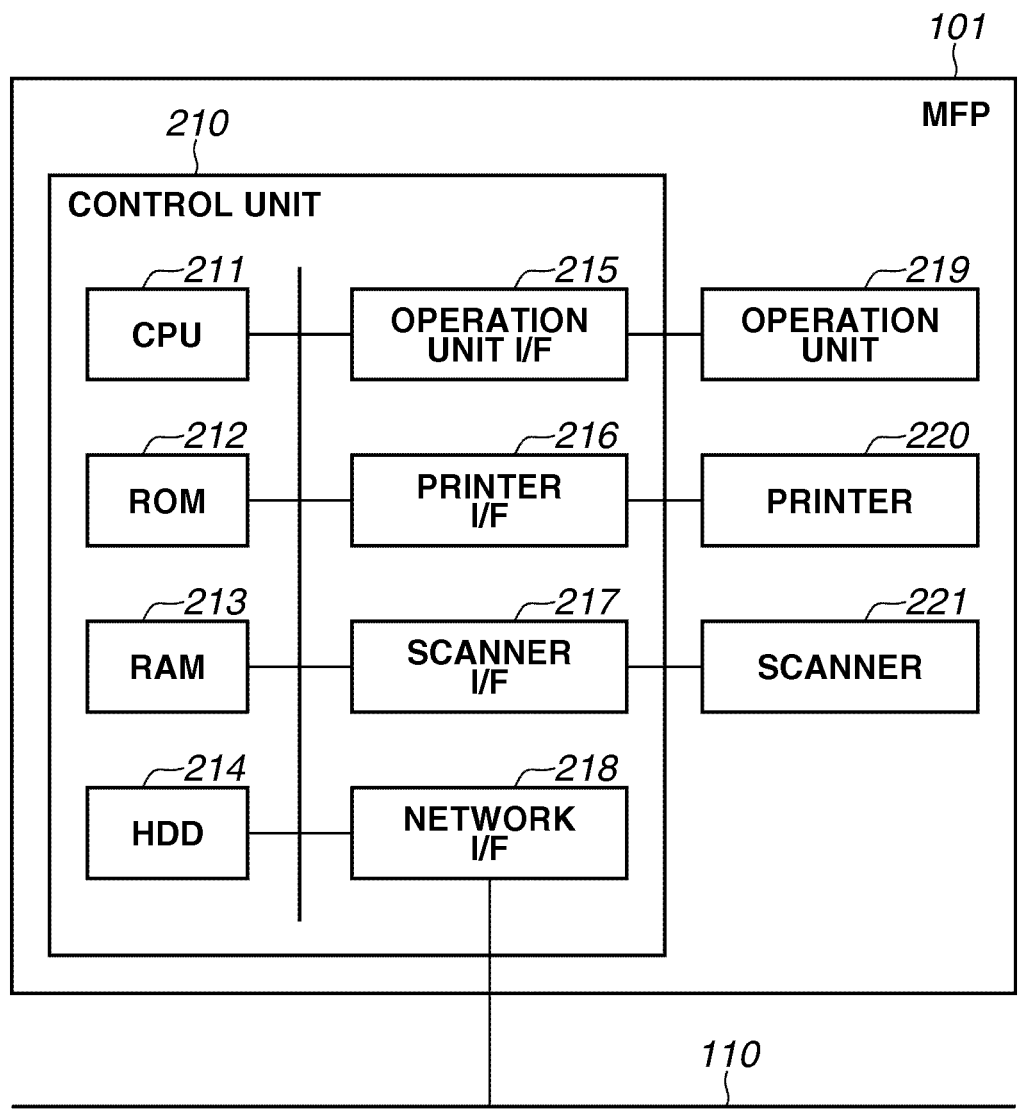
FIG. 2 is a block diagram illustrating a configuration of an MFP according to the present invention.

FIG. 2 is a block diagram illustrating a hardware configuration of the MFP 101.

A control unit 210 that includes a central processing unit (CPU) 211 controls the MFP 101. The CPU 211 reads a control program stored in a read-only memory (ROM) 212 or a hard disk drive (HDD) 214 to perform various control operations such as reading control and transmission control. The ROM 212 is a boot ROM to store a control program for executing processing of a flowchart illustrated in each of FIGS. 7 and 8, or information regarding a hard key table 500 illustrated in FIG. 5. The ROM 212 also stores an access destination of the web server 103.

A random access memory (RAM) 213 is used as a main memory of the CPU 211 or a temporary storage area such as a work area. As in the case of the ROM 212, the HDD 214 stores a control program for executing the processing of the flowchart illustrated in each of FIGS. 7 and 8, or the information regarding the hard key table 500 illustrated in FIG. 5. The HDD 214 stores the native application of the MFP 101.

An operation unit interface (I/F) 215 connects an operation unit 219 to the control unit 210. The operation unit I/F 215 outputs, to the operation unit 219, screen information to be displayed on the operation unit 219, and transmits information on a user's operation to the CPU 211 from the operation unit 219. The MFP 101 has a web browser function for analyzing a HyperText Markup Language (HTML) file received from the web server 103 and displaying an operation screen based on description of the received HTML file on a liquid crystal display unit of the operation unit 219.

A printer I/F 216 connects a printer 220 to the control unit 210. Image data to be printed by the printer 220 is transferred from the control unit 210 to the printer 220 via the printer I/F 216, and printed on a recording medium such as paper by the printer 220. A scanner I/F 217 connects a scanner 221 to the control unit 210. The scanner 221 reads an image on a document to generate image data, and the read image data is input to the control unit 210 via the scanner I/F 217.

A network I/F 218 connects the control unit 210 (MFP 101) to the LAN 110. The network I/F 218 transmits information such as image data to an external apparatus (e.g., web server 103) on the LAN 110 or receives information from the external apparatus on the LAN 110.

Figure 3:
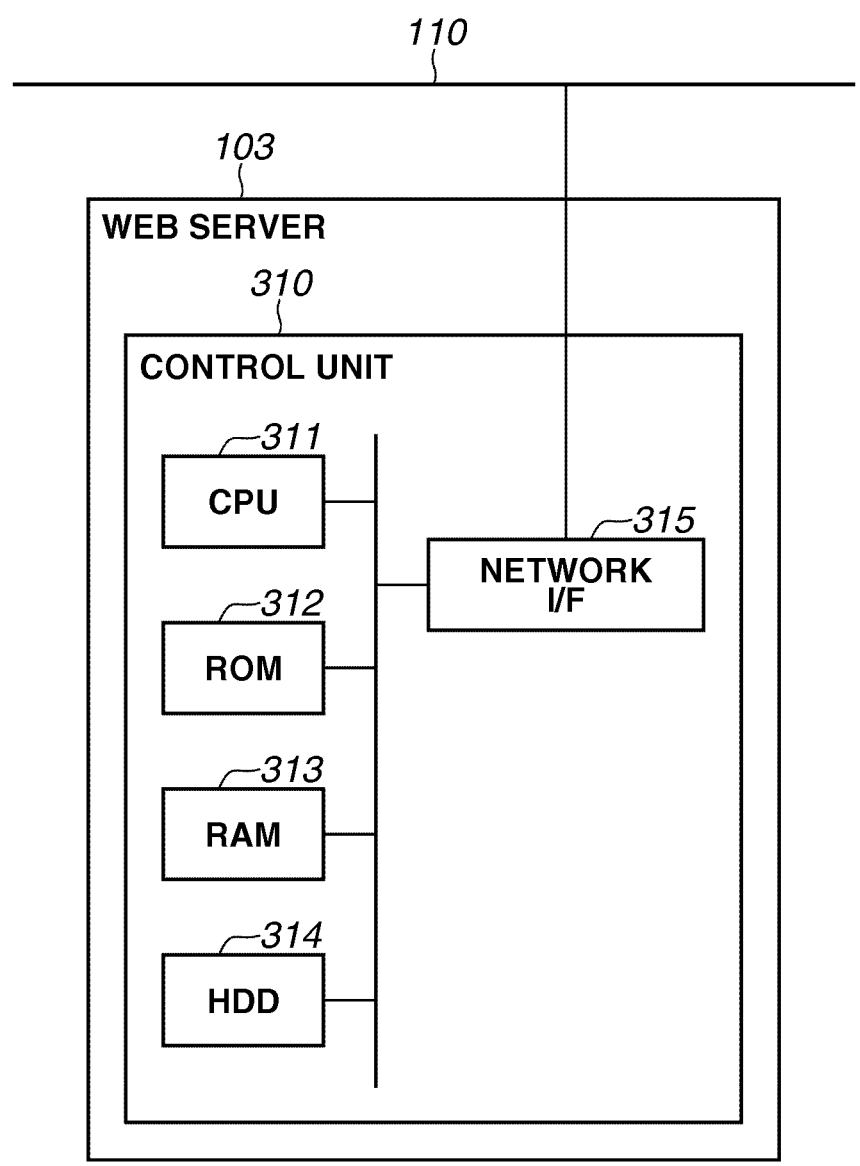
FIG. 3 is a block diagram illustrating a configuration of a web server according to the present invention.

FIG. 3 is a block diagram illustrating a hardware configuration of the web server 103.

A control unit 310 that includes a CPU 311 controls the web server 103. The CPU 311 reads a control program stored in a ROM 312 or an HDD 314 to perform various control operations such as reading control and transmission control. The ROM 312 is a boot ROM to store a control program for executing processing of a flowchart illustrated in FIG. 9, or information regarding the hard key table 500 illustrated in FIG. 5.

A RAM 313 is used as a main memory of the CPU 311 or a temporary storage area such as a work area. As in the case of the ROM 312, the HDD 314 stores the control program for executing the processing of the flowchart illustrated in FIG. 9, or the information regarding the hard key table 500 illustrated in FIG. 5. The HDD 314 stores the web application of the web server 103.

A network I/F 315 connects the control unit 310 to the LAN 110. The network I/F 315 transmits and receives information to/from other apparatuses (e.g., MFP 101) on the LAN 110.

Figure 4:
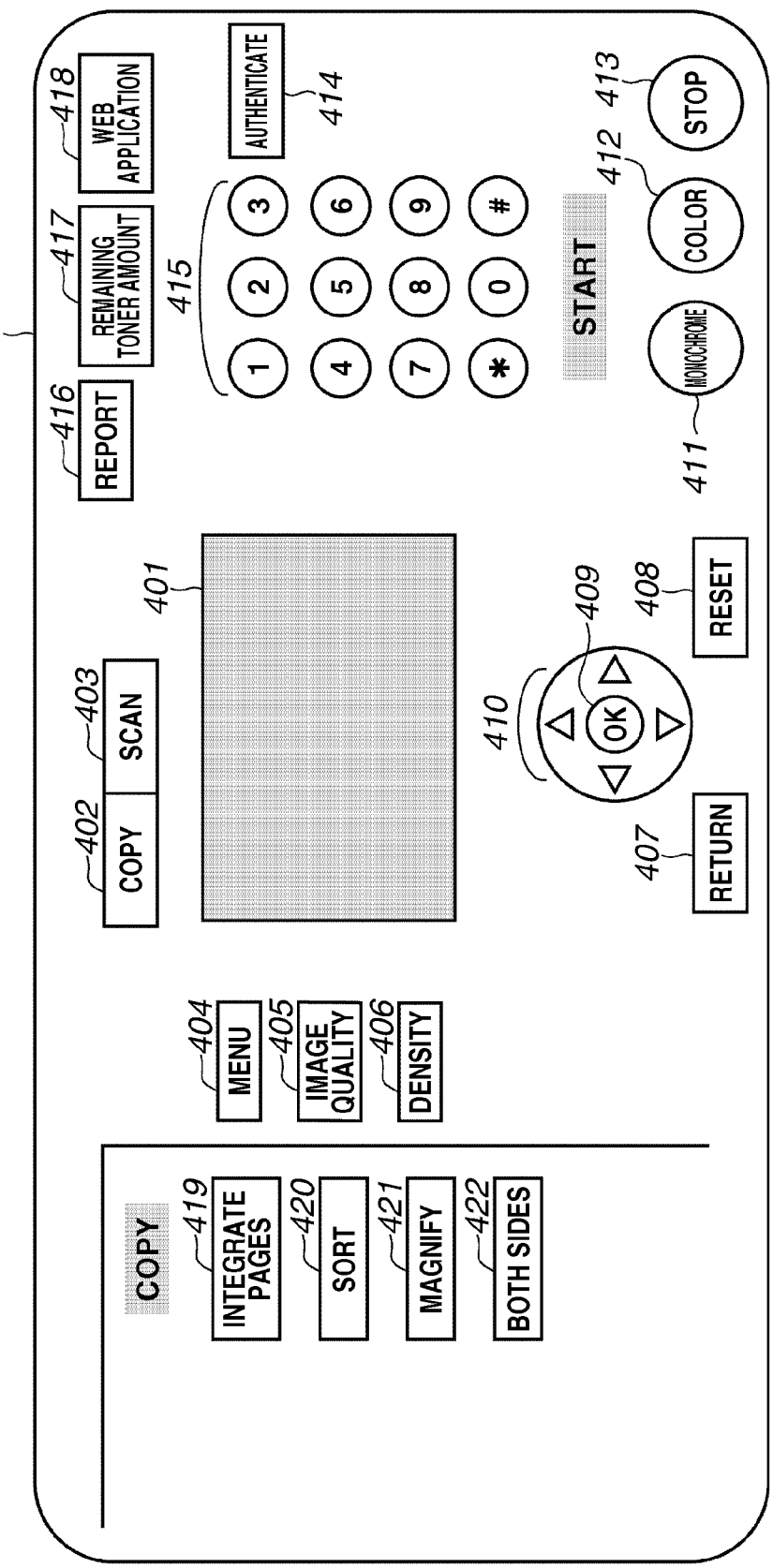
FIG. 4 illustrates an operation unit of an MFP according to a first exemplary embodiment of the present invention.

FIG. 4 illustrates an appearance of the operation unit 219 of the MFP 101. The MFP 101 has a copying function and a scanning function.

A liquid crystal display unit 401 displays an operation screen for operating the MFP 101. The liquid crystal display unit 41 can employ various forms such as a touch panel or a compact display panel where a display area is small.

The operation unit 219 includes a plurality of hard keys provided as execution buttons to use specific functions. An operation when each hard key is operated is described. The operation of the hard key described below assumes that the MFP 101 is in the native mode.

A copy key 402 is for changing to a setting screen of the copying function. A scan key 403 is for changing to a setting screen of the scanning function. A menu key 404 is for changing to a TOP screen of each setting screen. An image quality key 405 is for changing to a screen to set image quality during scanning. A density key 406 is for changing to a screen to set a printing density during printing. A return key 407 is for returning to a last screen. A reset key 408 is used for initializing setting.

An OK key 409 is for determining user's setting or selection. A cross key 410 is for selecting an item. A monochrome key 411 and a color key 412 are respectively for starting copying in monochrome and in color. A stop key 413 is for stopping an operation being executed. An authentication key 414 is for changing to an authentication screen for authentication. Numerical keys 415 are for inputting a numerical value. A report key 416 is for executing report printing. A remaining toner amount key 417 is for displaying a remaining toner amount of the MFP 101.

A web application key 418 is operated when the web application of the web server 103 is utilized. After detection of the operation of the web application key 418 by the CPU 211, the MFP 101 changes to the web mode, and an operation screen displayed on the liquid crystal display unit 401 becomes a screen based on the HTML file received from the web server 103.

A page integration key 419, a sort key 420, a magnification key 421, a both-side key 422 are for changing to screens to set respective operations when the copying function is utilized. The page integration key 419 is for changing to a screen to set N-in-one printing or a layout during the N-in-one printing. The sort key 420 is for changing to a screen to set sorting ON or OFF. The magnification key 421 is for changing to a screen to set magnification.

The both-side key 422 is for changing to a screen to set two-sided printing ON or OFF. The page integration key 419, the sort key 420, the magnification key 421, the both-side key 422 are hard keys exclusively used for utilizing the copying function. For example, even when these hard keys are operated during utilization of the scanning function by operating the scan key 403, no screen change occurs because the copying function is not used.

Each hard key described above is associated with identification information for identifying itself and managed in the MFP 101 as illustrated in FIG. 5.

FIG. 5 illustrates the hard key table 500. The hard key table 500 is stored in the ROM 212 or the HDD 214 of the MFP 101. In the hard key table 500, a hard key type 501 indicating each hard key and key ID 502 to identify each hard key are managed by associating with each other. For example, "web_app" is set as key ID in the web application key 418, and "copy" is set as key ID in the copy key 402. In the present exemplary embodiment, the web server 103 has a hard key table similar to the hard key table 500.

Figure 6:
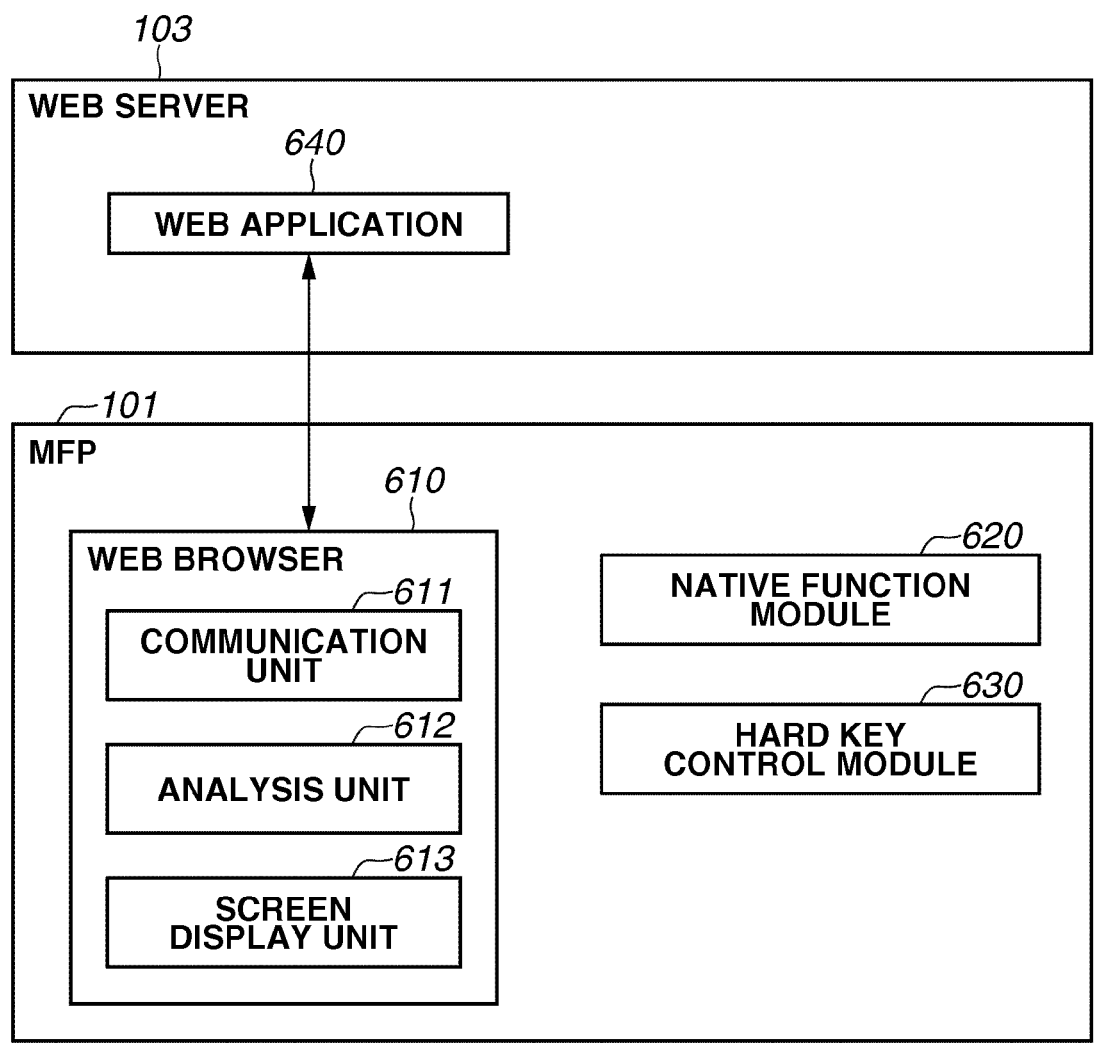
FIG. 6 is a block diagram illustrating a software configuration of the entire information processing system according to the present invention.

FIG. 6 illustrates a software configuration of the entire information processing system according to the present exemplary embodiment. A software function illustrated in FIG. 6 is achieved by executing the control program stored in the ROM or the HDD by the CPU included in each of the MFP 101 and the web server 103 illustrated in FIGS. 2 and 3.

The MFP 101 includes a web browser 610, a native function module 620, and a hard key control module 630.

The web browser 610 includes a communication unit 611, an analysis unit 612, and a screen display unit 613. The communication unit 611 communicates with the web application 640 of the web server 103 according to a HyperText Transfer Protocol (HTTP) protocol. More specifically, the communication unit 611 requests an operation screen to be displayed by the web browser 610 from the web application 640, and notifies the web application 640 of an instruction input from the user via the operation unit 219. Upon receiving the notification of the key ID 502 from the hard key control module 630, the communication unit 611 notifies the access destination of the web server 103 stored in the ROM 212 or the HDD 214 of a request of screen information by using the key ID 502.

The analysis unit 612 analyzes the HTML file received from the web application 640. The HTML file contains description indicating contents of the operation screen to be displayed by the web browser 610.

The screen display unit 613 displays the operation screen on the liquid crystal display unit 401 based on the analysis result of the analysis unit 612.

The native function module 620 manages the native application of the MFP 101. The native function module 620 generates screen information to be displayed on the liquid crystal display unit 401 of the operation unit 219 according to a user's operation, or executes processing of the native application. Having determined that the web application key 418 has been operated, the native function module 620 activates the web browser 610 to change the MFP 101 to the web mode.

Upon receiving notification of the operation of the hard key from the operation unit 219, the hard key control module 630 refers to the hard key table 500 to notify the native function module 620 of the key ID 502 corresponding to the notified hard key type 501. However, when the MFP 101 has changed to the web mode, the hard key control module 630 notifies the web browser 610 of the key ID 502.

The web server 103 includes the web application 640. The web application 640 communicates with the communication unit 611 to transmit, to the MFP 101, the operation screen to be displayed by the web browser 610 of the MFP 101 in response to the request from the MFP 101.

Figure 7:
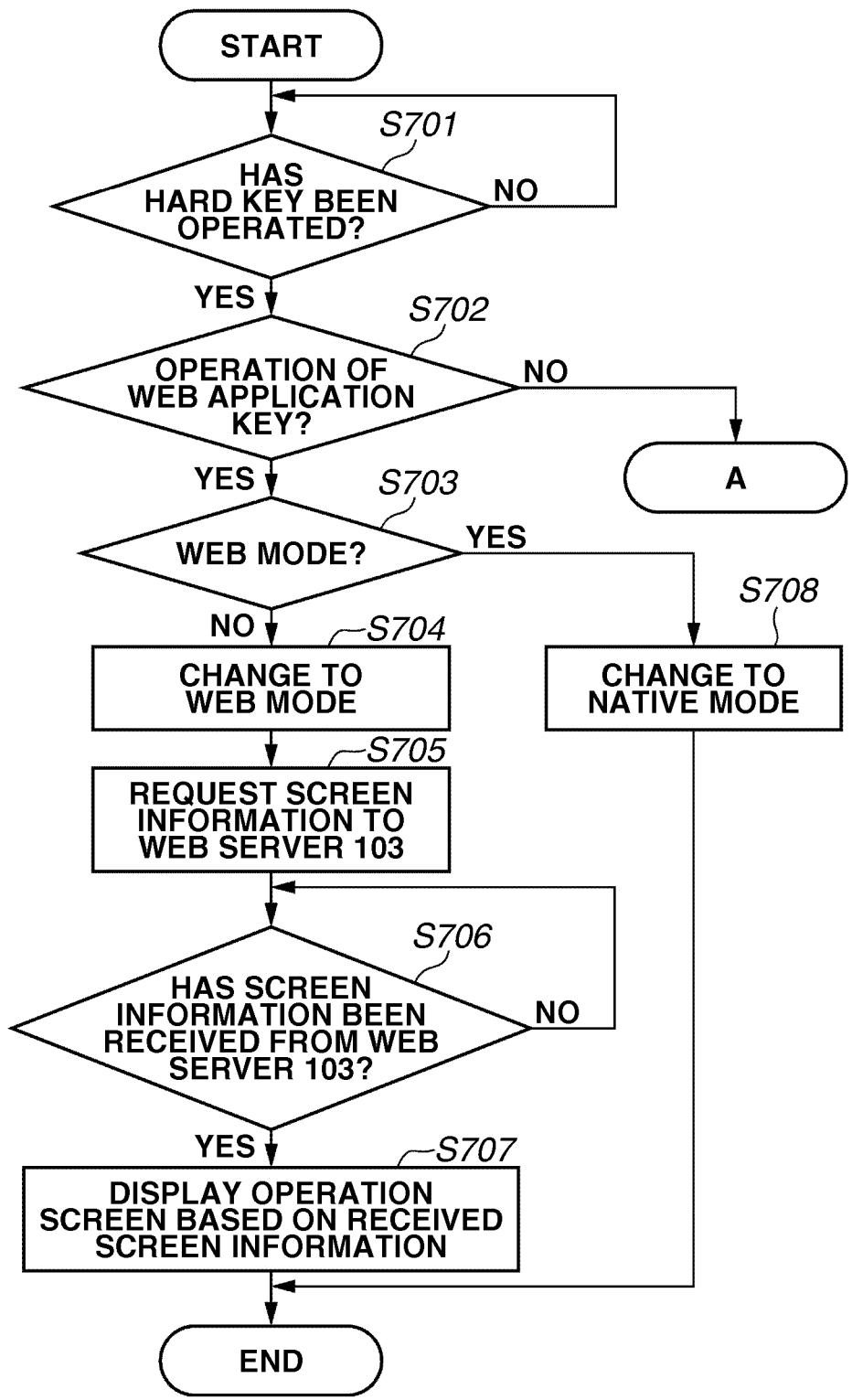
FIG. 7 is a flowchart illustrating processing when hard keys included in the MFP are operated according to the first exemplary embodiment of the present invention.

FIG. 7 is a flowchart illustrating a processing procedure executed by the MFP 101 when the user operates the hard keys illustrated in FIG. 4. Processing in steps S701 to S708 is executed by rasterizing and executing, in the RAM, a program stored in the memory such as the ROM by the CPU included in the MFP 101.

First, in step S701, the CPU 211 determines whether any hard key has been operated on the operation unit 219. When it is determined that the hard key has been operated (YES in step S701), the processing proceeds to step S702. Otherwise (NO in step S701), the processing stands by until a hard key is operated.

Figure 8:
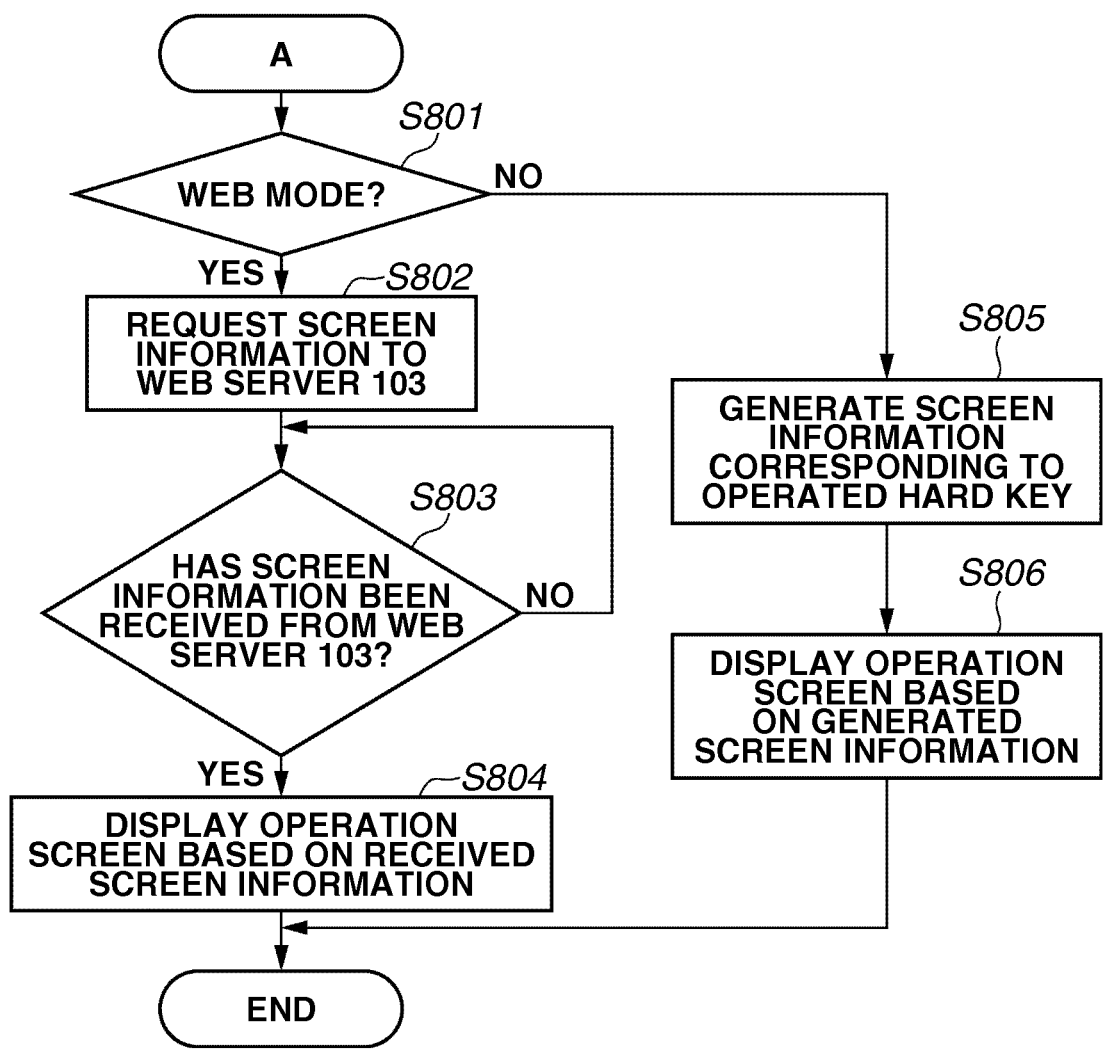
FIG. 8 is a flowchart illustrating processing when the hard keys included in the MFP are operated according to the first exemplary embodiment of the present invention.

In step S702, the CPU 211 determines whether the operated hard key is the web application key 418. When the operated hard key is the web application key 418 (YES in step S702), the processing proceeds to step S703. When the operated hard key is other than the web application key 418 (NO in step S702), processing in a flowchart illustrated in FIG. 8 is executed.

Referring back to the flowchart illustrated in FIG. 7, in step S703, the CPU 211 determines whether the MFP 101 is currently operated in the web mode. As described above, in the present exemplary embodiment, the MFP 101 operates in one of the web mode and the native mode. Information regarding which of the modes the MFP is currently operated in is stored in, for example, the RAM 213. The CPU 211 accesses the RAM 213 to execute determination.

When it is determined that the MFP 101 is currently operated in the web mode (YES in step S703), the processing proceeds to step S708, and the CPU 211 changes the MFP 101 to the native mode to end the processing. When it is determined that the MFP 101 is not currently operated in the web mode (NO in step S703), the processing proceeds to step S704, and the CPU 211 changes the MFP 101 to the web mode. In this case, the CPU 211 activates the web browser 610.

In step S704 and in step S708, the CPU 211 respectively stores that the MFP 101 is in the web mode and is in the native mode in the RAM 213.

In step S705, the CPU 211 adds the key ID of the web application key 418 to the access destination of the web server 103 stored in the ROM 212, and requests screen information from the web server 103. For example, if the access destination of the web server 103 stored in the ROM 212 is "http://server_top", the CPU 211 adds the key ID "web_app" of the web application key 418 to write "http://server_top?key_id=web_app", and requests the screen information. Processing executed by the web server 103 that receives the request of the screen information is described below referring to a flowchart illustrated in FIG. 9.

In step S706, the CPU 211 determines whether the screen information has been received from the web server 103. When it is determined that the screen information has been received from the web server 103 (YES in step S706), the processing proceeds to step S707. When not received (NO in step S706), the processing stands by until the screen information is received from the web server 103. In step S707, based on the received screen information, the CPU 211 displays an operation screen on the liquid crystal display unit 401.

Next, referring to FIG. 8, processing is described. FIG. 8 is a flowchart illustrating the processing executed when the hard key operated in step S702 illustrated in FIG. 7 is other than the web application key 418. Processing in steps S801 to S806 is executed by rasterizing and executing, in the RAM, a program stored in the memory such as the ROM by the CPU included in the MFP 101.

In step S801, the CPU 211 determines whether the MFP 101 is currently operated in the web mode. The information regarding which of the modes the MFP is currently operated in is stored in, for example, the RAM 213. The CPU 211 accesses the RAM 213 to execute determination. When it is determined that the MFP 101 is currently operated in the web mode (YES in step S801), the processing proceeds to step S802.

On the other hand, when it is determined that the MFP 101 is not currently operated in the web mode (NO in step S805), the processing proceeds to step S805. In step S805, since the MFP 101 is operated in the native mode, the MFP 101 generates screen information corresponding to an operated hard key. For example, when the sort key 420 is operated, the CPU 211 generates screen information for displaying an operation screen to set sorting ON or OFF.

In step S806, based on the generated screen information, the CPU 211 displays an operation screen on the liquid crystal display unit 401. The operation screen displayed in this case is for setting sorting ON or OFF in the present example.

Next, step S802 is described. In step S802, as in the case of step S705, the CPU 211 requests screen information from the web server 103. For example, when the sort key 420 is operated, the CPU 211 adds the key ID "sort" of the sort key 420 to write "http://server_top?key_id=sort", and requests the screen information.

In step S803, the CPU 211 determines whether the screen information has been received from the web server 103. When it is determined that the screen information has been received from the web server 103 (YES in step S803), the processing proceeds to step S804. When not received (NO in step S803), the processing stands by until the screen information is received from the web server 103. In step S804, based on the received screen information, the CPU 211 displays an operation screen on the liquid crystal display unit 401. The operation screen displayed in this case is for setting sorting ON or OFF in the present example.

Thus, whichever of the native mode and the web mode the MFP 101 is in, for example, when the sort key 420 is operated, the operation screen to be displayed is for setting sorting ON or OFF.

Figure 9:
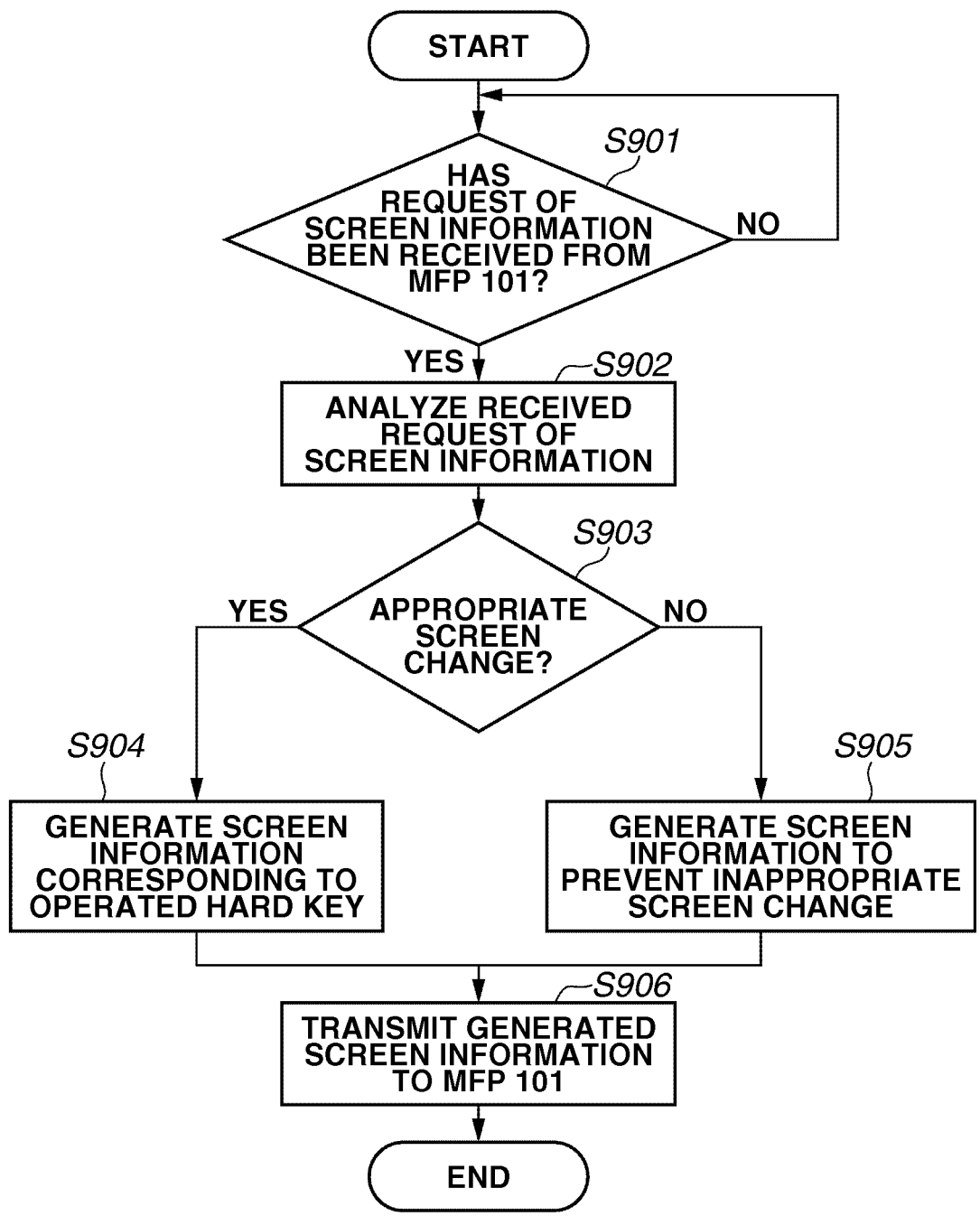
FIG. 9 is a flowchart illustrating processing executed by the web server according to the first exemplary embodiment of the present invention.

Next, referring to a flowchart illustrated in FIG. 9, processing executed by the web server 103 that has received the screen information request from the MFP 101 is described. Processing in steps S901 to S906 is executed by rasterizing and executing, in the RAM, a program stored in the memory such as the ROM by the CPU included in the web server 103.

In step S901, the CPU 311 of the web server 103 determines whether the screen information request has been received from the MFP 101. When it is determined that the screen information request has been received (YES in step S901), the processing proceeds to step S902. When not received (NO in step S901), the processing stands by until the screen information request is received.

In step S902, the CPU 311 analyzes the received screen information request. An example where in step S901, the web server 103 receives a request of screen information, namely, "http://server_top?key_id=sort" is described. First, the CPU 311 reads the key ID from the received screen information request. In the present example, the key ID "sort" is read. The web server 103 has the hard key table 500 as in the case of the MFP 101, and hence the CPU 311 can determine that the sort key 420 has been operated in the MFP 101.

In step S903, based on an analysis result of step S902, the CPU 311 determines whether an appropriate screen change is executed in the MFP 101. As described above referring to FIG. 4, the sort key 420 is the hard key exclusively used for utilizing the copying function. Thus, the web server 103 determines whether the MFP 101 is using the copying function.

This determination can be achieved by, for example, storing whether the screen information transmitted from the web server 103 to the MFP 101 immediately before concerns the copying function in the RAM 313 of the web server 103. When the MFP 101 is using the copying function, the CPU 311 determines as an appropriate screen change (YES in step S903), and the processing proceeds to step S904. When the MFP 101 is not using the copying function, the CPU 311 determines as an inappropriate screen change (NO in step S903), and the processing proceeds to step S905.

In step S904, the CPU 311 generates screen information corresponding to the hard key operated in the MFP 101. In the present example, the operated hard key is the sort key 420. As described above referring to FIG. 4, the sort key 420 is for changing to the screen to set sorting ON or OFF when the MFP 101 is operated in the native mode.

Thus, the web server 103 generates screen information for displaying the screen for setting the sorting ON or OFF so that even in the web mode, the user of the MFP 101 can acquire operability equal to that in the native mode. In step S905, the web server 103 generates screen information to prevent the MFP 101 from executing an inappropriate screen change. For example, the CPU 311 generates the screen information transmitted immediately before again.

After the generation of the screen information in step S904 or S905, in step S906, the CPU 311 transmits the screen information to the MFP 101.

Figure 10:
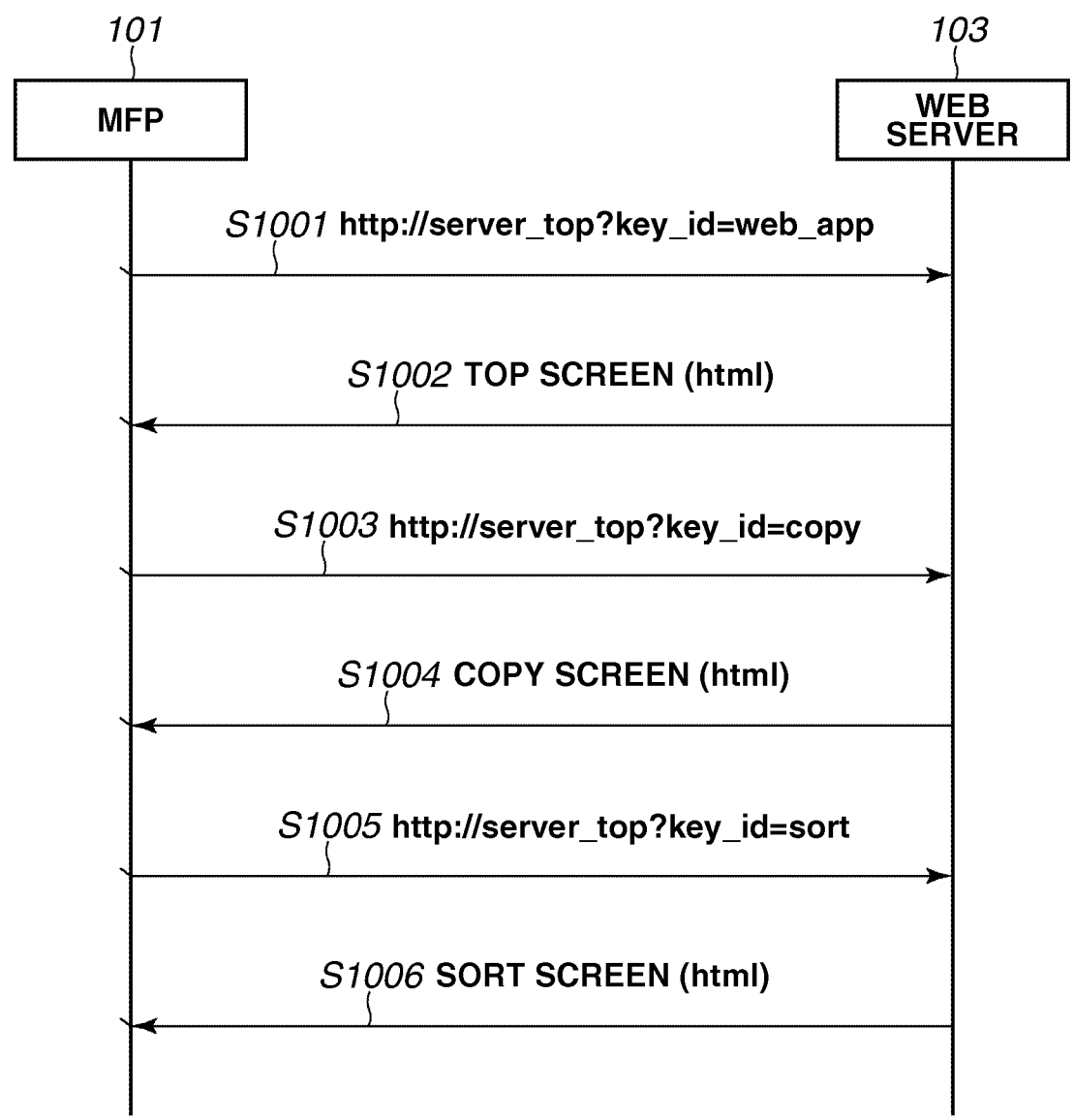
FIG. 10 illustrates a processing sequence when the hard keys included in the MFP are sequentially operated according to the first exemplary embodiment of the present invention.

Next, referring to FIG. 10, a processing sequence when the hard keys are sequentially operated according to the present exemplary embodiment is described. FIGS. 11A to 11D illustrate examples of operation screens displayed on the liquid crystal display unit 401 in this case.

FIG. 10 illustrates the processing sequence, for example, when the user sequentially operates the web application key 418, the copy key 402, and the sort key 420. In FIG. 10, a vertical axis is a time axis. In FIG. 10, as an initial state, the access destination of the web server 103 is stored as "http://server_top" in the ROM 212, and the MFP 101 is operated in the native mode. An operation screen 1101 illustrated in FIG. 11A is displayed on the liquid crystal display unit 401. The operation screen 1101 is displayed based on screen information generated by the native function module 620.

First, in step S1001, the user operates the web application key 418. Then, the MFP 101 activates the web browser 610, executes the processing of the flowcharts illustrated in FIGS. 7 and 8, and requests screen information from the web server 103. In reality, the MFP 101 writes "http://server_top?key_id=web_app" to request the screen information.

In step S1002, the web server 103 detects the operation of the web application key 418 of the MFP 101, executes the processing of the flowchart illustrated in FIG. 9, and transmits the screen information to the MFP 101. The MFP 101 displays an operation screen based on the received screen information.

Figure 11B:
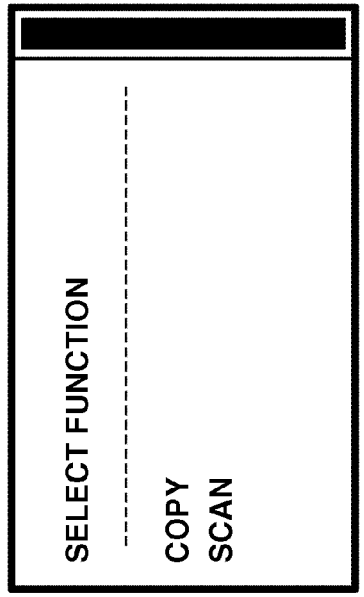
FIGS. 11A to 11D each illustrates an example of an operation screen displayed on the MFP according to the first exemplary embodiment of the present invention.

In this case, an operation screen 1102 illustrated in FIG. 11B is displayed on the liquid crystal display unit 401. The operation screen 1102 is based on the screen information generated by the web server 103. The MFP 101 has the copying function and the scanning function, and hence the operation screen 1102 is displayed as a top screen to select the functions.

In step S1003, the user operates the copy key 402. In this case, the MFP 101 executes the same processing as that in step S1001. However, the hard key operated by the user is the copy key 402, and hence the MFP 101 writes "http://server_top?key_id=copy" to request screen information.

In step S1004, the same processing as that in step S1002 is executed. In this case, an operation screen 1103 illustrated in FIG. 11C is displayed on the liquid crystal display unit 401. The operation screen 1103 is based on the screen information generated by the web server 103. The operation screen 1103 is displayed as a copy screen to set the copying function.

In step S1005, the user operates the sort key 420. In this case, the MFP 101 executes the same processing as that in step S1001. However, the hard key operated by the user is the sort key 420, and hence the MFP 101 writes "http://server_top?key_id=sort" to request screen information.

In step S1006, the same processing as that in step S1002 is executed. The sort key 420 is a hard key exclusively used for utilizing the copying function. However, the screen information transmitted from the web server 103 in step S1004 concerns the copying function. Thus, the web server 103 determines that the MFP 101 has executed an appropriate screen change, and generates screen information for displaying a screen to set sorting ON or OFF.

Figure 11D:
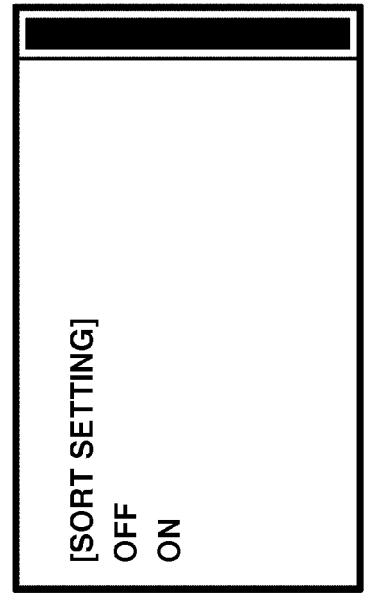
Figure 11A:
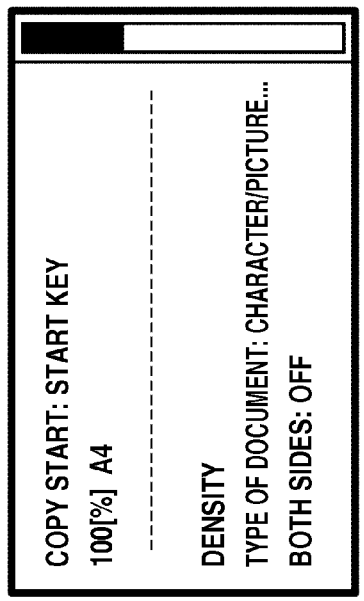
Figure 11C:
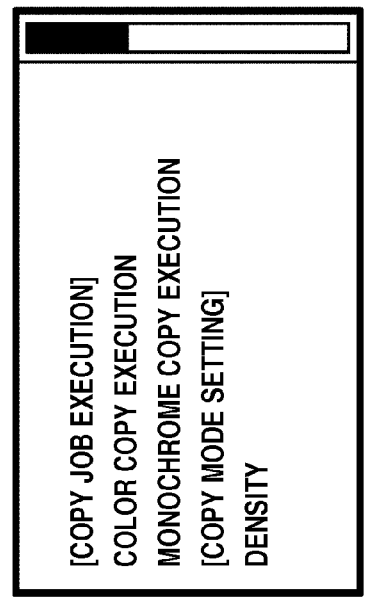

In this case, an operation screen 1104 illustrated in FIG. 11D is displayed on the liquid crystal display unit 401. The operation screen 1104 is based on the screen information generated by the web server 103. The operation screen 1104 is displayed as a sort screen to set the sort function ON or OFF.

Figure 12:
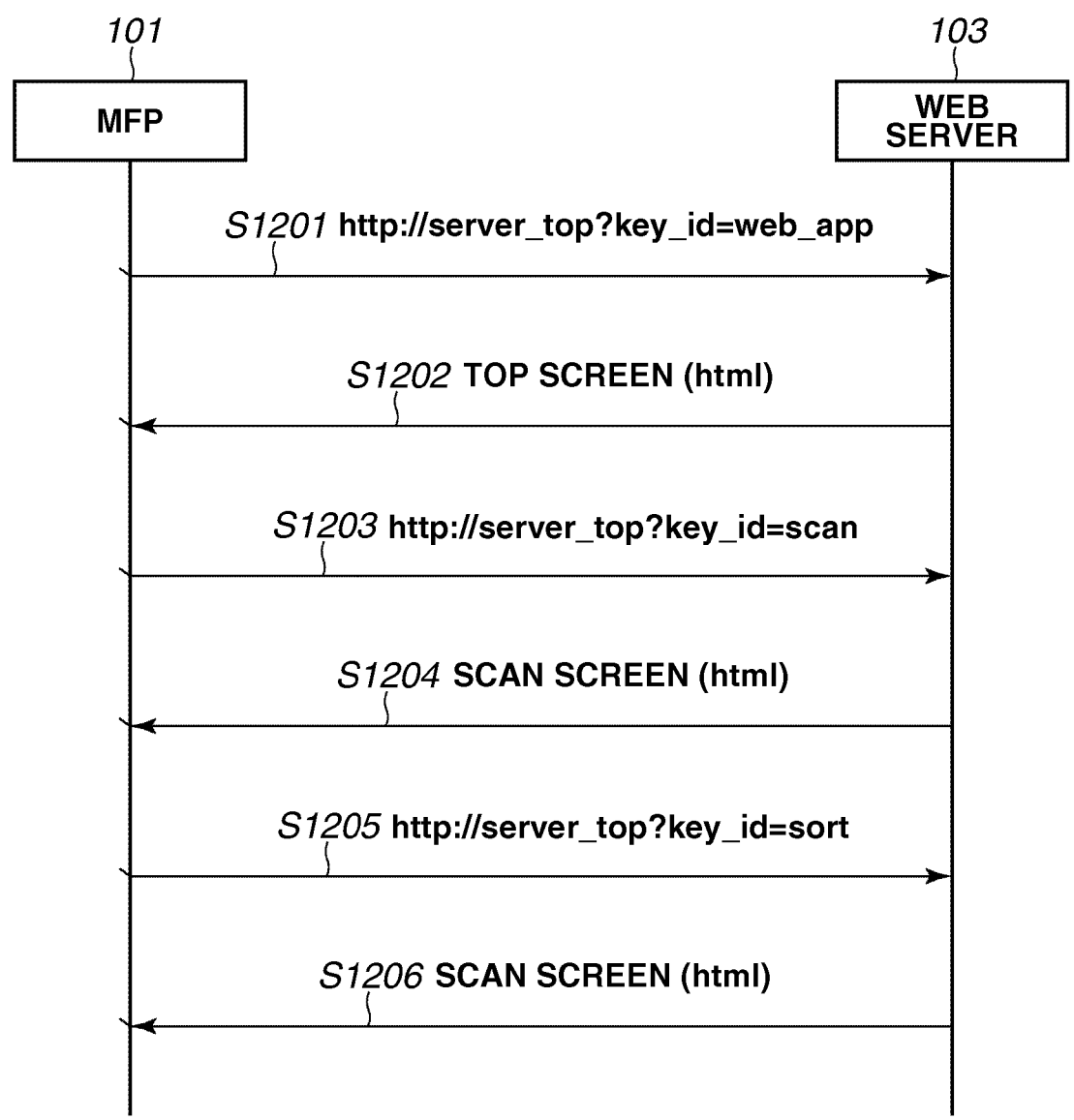
FIG. 12 illustrates a processing sequence when the hard keys included in the MFP are sequentially operated according to the first exemplary embodiment of the present invention.

Next, referring to FIG. 12, a processing sequence, for example, when the user sequentially operates the web application key 418, the scan key 403, and the sort key 420 is described. In the processing sequence illustrated in FIG. 12, as in the case illustrated in FIG. 10, as an initial state, the access destination of the web server 103 is stored as "http://server_top" in the ROM 212, and the MFP 101 is operated in the native mode.

Figure 13A:
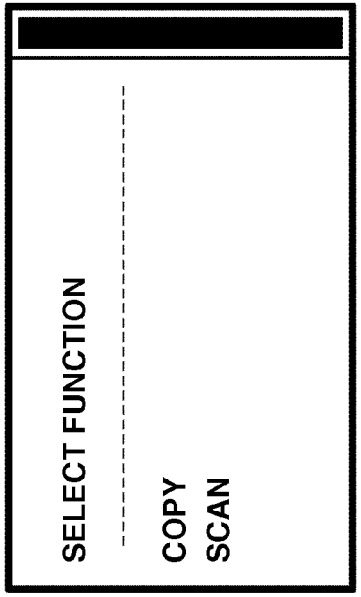
FIGS. 13A to 13C each illustrates an example of an operation screen displayed on the MFP according to the first exemplary embodiment of the present invention.

An operation screen 1301 illustrated in FIG. 13A is displayed on the liquid crystal display unit 401. The operation screen 1301 is displayed based on screen information generated by the native function module 620.

Figure 13B:
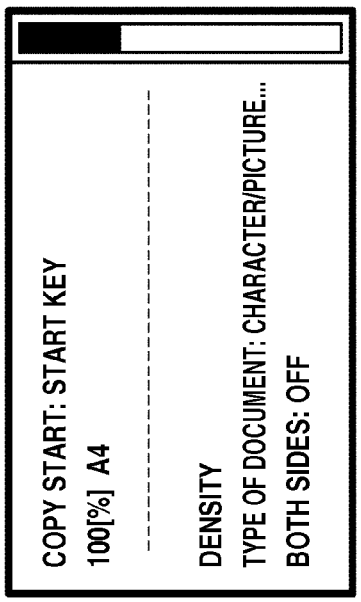

Processing in step S1201 and step S1202 are similar to that in step S1001 and step S1002 illustrated in FIG. 10, and thus description thereof is omitted. In step S1202, an operation screen 1302 illustrated in FIG. 13B is displayed on the liquid crystal display unit 401. As in the case of the operation screen 1102, the operation screen 1302 is based on the screen information generated by the web server 103.

In step S1203, the user operates the scan key 403. In this case, the MFP 101 executes the same processing as that in step S1201. However, the hard key operated by the user is the scan key 403, and hence the MFP 101 writes "http://server_top?key_id=scan" to request screen information.

Figure 13C:
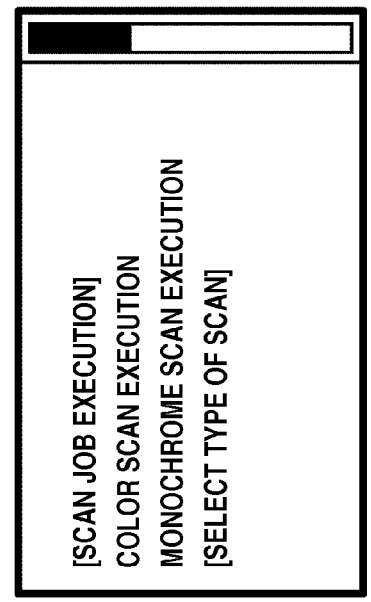

In step S1204, the same processing as that in step S1202 is executed. In this case, an operation screen 1303 illustrated in FIG. 13C is displayed on the liquid crystal display unit 401. The operation screen 1303 is based on the screen information generated by the web server 1303. The operation screen 1303 is displayed as a scan screen to set the scanning function.

In step S1205, the user operates the sort key 420. In this case, the MFP 101 executes the same processing as that in step S1201. However, the hard key operated by the user is the sort key 420, and hence the MFP 101 writes "http://server_top?key_id=sort" to request screen information.

In step S1206, the same processing as that in step S1202 is executed. The sort key 420 is a hard key exclusively used for utilizing the copying function. However, the screen information transmitted from the web server 103 in step S1204 concerns the scanning function, not the copying function. Thus, the web server 103 determines that the MFP 101 has not executed an appropriate screen change, and transmits the same screen information as that in step S1204 to the MFP 101. As a result, the operation screen 1303 is displayed on the liquid crystal display unit 401.

As described above, the web server 103 understands the screen change of the MFP 101. Thus the web server 103 can perform control to prevent an inappropriate screen change at the liquid crystal display unit 401 even when a meaningless hard key is operated.

As described above, according to the present exemplary embodiment, whichever of the web application and the native application is being executed when a specific hard key is operated, the function achieved by the hard key can be made uniform.

The first exemplary embodiment is described by way of case where the MFP 102 is similar in configuration to the MFP 101. Generally, however, there are various types of MFPs. Functions may therefore vary from one type of an MFP to another. In view of this, a second exemplary embodiment is directed to processing when a plurality of MFPs having different functions is connected to a web server 103.

Figure 14:
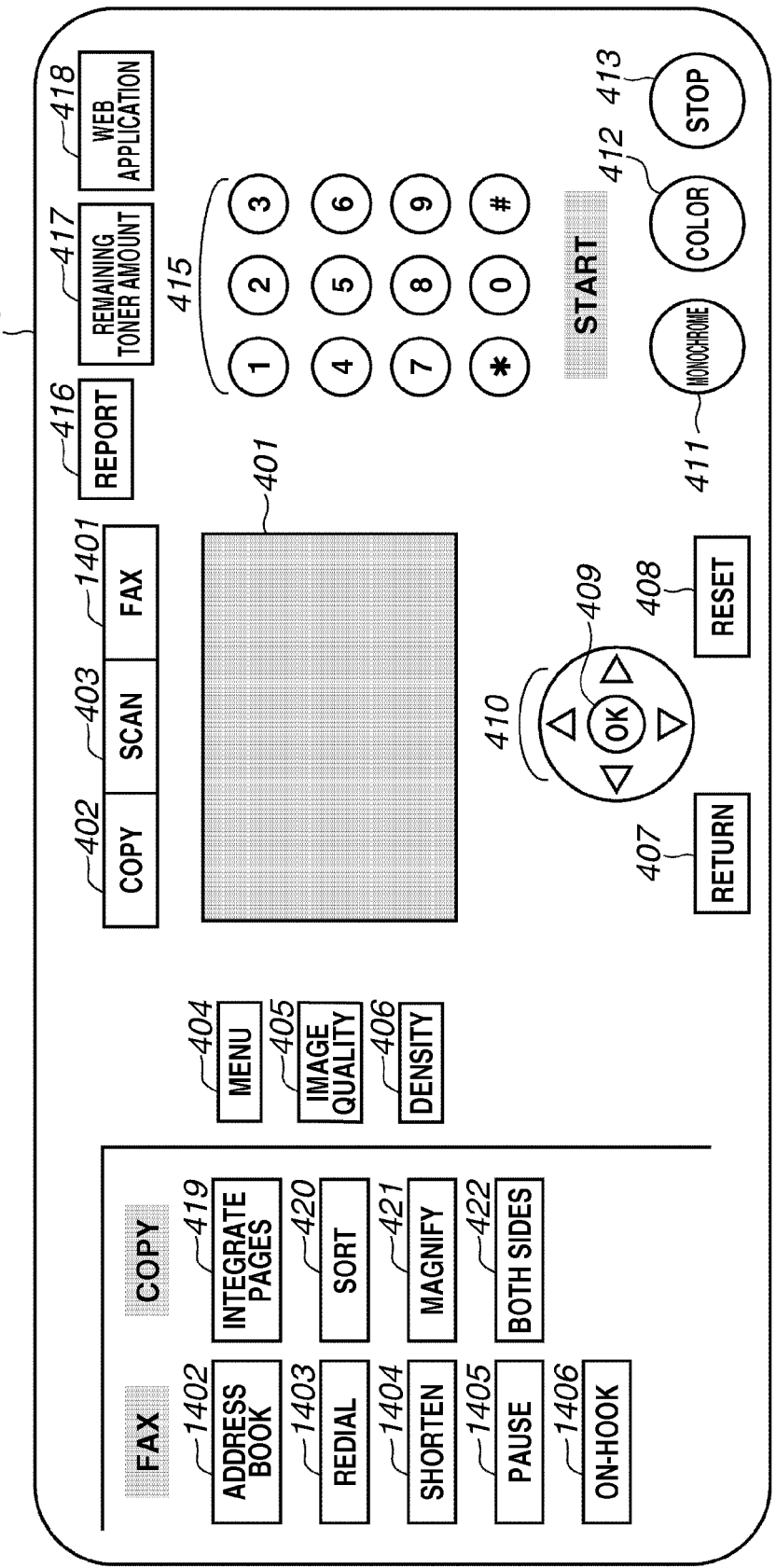
FIG. 14 illustrates an operation unit of an MFP according to a second exemplary embodiment of the present invention.

FIG. 14 illustrates an appearance of an operation unit 219 of an MFP 102. The MFP 102 has a facsimile function in addition to a copying function and a scanning function. However, the MFP 102 has no authentication function included in an MFP 101. Hereinafter, only hard keys different from those of the MFP 101 are described.

A fax key 1401 is for changing to a setting screen of the facsimile function. An address book key 1402, a redial key 1403, a shorten key 1404, a pause key 1405, and an on-hook key 1406 are for changing to screens to execute respective setting operations when the facsimile function is utilized. The address book key 1402 is for changing to a screen to select an address book for facsimile transmission. The redial key 1403 is used when facsimile transmission is executed again to a destination to which facsimile transmission has been executed. The shorten key 1404 is for changing to a screen to easily select a frequently used destination from destinations registered in the address book.

The pause key 1405 is for pausing the facsimile function. The on-hook key 1406 is for executing on-hook processing of the facsimile function. The address book key 1402, the redial key 1403, the shorten key 1404, the pause key 1405, and the on-hook key 1406 are hard keys exclusively used for utilizing the facsimile function. Even when these hard keys are operated during utilization of functions other than the facsimile function, for example, the copying function and the scanning function, no screen change occurs because the facsimile function is not utilized. Since the MFP 102 does not have the authentication function, the authentication key 414 of the MFP 101 is not included in the operation unit 219 of the MFP 102.

Next, a hard key table included in each of the MFP 101, the MFP 102, and the web server 103 is described. The MFP 101 includes the hard key table 500 illustrated in FIG. 5. The MFP 102 includes a hard key table 1500 illustrated in FIG. 15A. Different from the hard key table 500, the hard key table 1500 includes more items regarding the facsimile function, while there is no item regarding the authentication function.

The web server 103 includes a hard key table 1510 illustrated in FIG. 15B. The hard key table 1510 includes all items regarding the hard keys included in the MFP 101 and the MFP 102. In the present exemplary embodiment, even when an MFP 104 (not illustrated) is added, only information on hard keys of the MFP 104 needs to be added to the configuration of the hard key table 1510 included in the web server 103. Thus, there is no need to change the configurations of the hard key tables included in the existing MFPs 101 and 102.

As described above, according to the present exemplary embodiment, even when an MFP having a new function is added, key ID of a hard key regarding the new function only needs to be set to a value different from that of exiting key ID, and there is no need to change the configuration of the existing hard key table. Further, the key ID of the hard key regarding the new function only needs to be added to the hard key table included in the web server 103. This facilitates management of the entire system.

A third exemplary embodiment is directed to a method for identifying not only a type of a hard key operated by a user but also a model of an MFP when a plurality of MFPs different in model (MFP 101 and MFP 102 in the present exemplary embodiment) is connected to a web server 103. In the present exemplary embodiment, the MFP 101 and the MFP 102 store model IDs to identify themselves in a ROM 212, and the web server 103 can identify the model IDs of the MFP 101 and the MFP 102. In this case, the model ID of the MFP 101 is MFP 1, and the model ID of the MFP 102 is MFP 2.

The MFP 101 includes the operation unit 219 illustrated in FIG. 4, and the hard key table 500 illustrated in FIG. 5. The MFP 102 includes the operation unit 219 illustrated in FIG. 14, and the hard key table 1500 illustrated in FIG. 15A. The web server 103 includes the hard key table 1510 illustrated in FIG. 15B, and has information on each model of the MFP. The information on each model of the MFP specifically means that a function of each MFP, a size of a liquid crystal display unit 401, and setting items are supplied for each model of the MFP.

Next, a processing procedure executed when the user operates the hard keys illustrated in FIG. 4 or FIG. 14 according to the present exemplary embodiment is described. Processing procedures executed in the MFP 101 and the MFP 102 in this case are similar to those of the flowcharts illustrated in FIGS. 7 and 8. However, in step S705 and step S802, the web server 103 is notified of the model ID in addition to the key ID.

For example, an access destination of the web server 103 stored in the ROM 212 of the MFP 101 is "http://server_top", and the web application key 418 of the MFP 101 is operated. Then, in step S705, "http://server_top?dev_id=MFP1&key_id=web_app" is written by using the key ID "web_app" of the web application key 418 and the model ID "MFP1" of the MFP 101 to request screen information.

Next, a processing procedure executed by the web server 103 that has received the screen information requests from the MFP 101 and the MFP 102 according to the present exemplary embodiment is described. The processing procedure executed by the web server 103 is similar to that of the flowchart illustrated in FIG. 9. However, in step S902, the model ID is read from the received screen information request in addition to the key ID.

For example, the web server 103 receives a screen information request of "http://server_top?dev_id=MFP1&key_id=web_app". Then, in step S902, the web server 103 reads the model ID "MFP 1" and the key ID "web_app" to determine that the web application key 418 of the MFP 101 has been operated. In step S904, in view of the model of the MFP 101, the web server 103 generates appropriate screen information to be displayed on the liquid crystal display unit 401. Similarly, in step S905, in view of the model of the MFP 101, the web server 103 generates appropriate screen information to be displayed on the liquid crystal display unit 401.

Next, referring to FIG. 16, a processing sequence when the web application key 418 is operated in each of the MFP 101 and the MFP 102 is described.

In FIG. 16, a vertical axis is a time axis. In FIG. 16, as an initial state, the access destination of the web server 103 is stored as "http://server_top" in the ROM 212 of each MFP, and each MFP is operated in the native mode.

First, in step S1601, the user operates the web application key 418 of the MFP 101. Then, the MFP 101 activates the web browser 610, and requests screen information from the web server 103. In reality, the MFP 101 writes "http://server_top?dev_id=MFP1?key_id=web_app" to request the screen information. The parameter dev_id indicates the model ID of the MFP 101.

In step S1602, the web server 103 detects the operation of the web application key 418 of the MFP 101, and generates appropriate screen information to transmit it to the MFP 101. In this case, the web server 103 can determine a model of the MFP 101 that has requested the screen information by reading the model ID, and hence the web server 103 generates the screen information in view of the model of the MFP 101. More specifically, the web application 103 generates the screen information by taking into account the size of the liquid crystal display unit 401 of the MFP 101 or the function of the MFP 101. The MFP 101 displays an operation screen based on the received screen information. The operation screen displayed in this case is a top screen for selecting the copying function and the scanning function of the MFP 101.

In step S1603, the user operates the web application key 418 of the MFP 102. Then, the MFP 102 activates the web browser 610, and requests screen information from the web server 103. In reality, the MFP 102 writes "http://server_top?dev_id=MFP2?key_id=web_app" to request the screen information. In this case, the MFP 102 is different from the MFP 101 in model, and hence a value of the parameter dev_id is different from that of the screen information request in step S1601.

In step S1604, the web server 103 detects the operation of the web application key 418 of the MFP 102, and generates appropriate screen information to transmit it to the MFP 102. In this case, as in the case of step S1602, the web server 103 generates the screen information in view of the model of the MFP 102. The MFP 102 displays an operation screen based on the received screen information. The operation screen displayed in this case is a top screen for selecting the copying function, the scanning function, and the facsimile function of the MFP 102.

As described above, according to the present exemplary embodiment, when the plurality of MFPs different in model (MFP 101 and MFP 102 in the present exemplary embodiment) is connected to the web server 103, the web server 103 can generate the screen information in view of the model of the MFP. As a result, the user can use an appropriate operation screen according to the model of each MFP to be used, and operability can accordingly be improved.

Aspects of the present invention can also be realized by a computer of a system or apparatus (or devices such as a CPU or a micro processing unit (MPU)) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-203336 filed Sep. 10, 2010, which is hereby incorporated by reference herein in its entirety.

What is claimed is:

1. A printing apparatus operable in one of a web mode for displaying a screen provided by a web application of a web server and a native mode for displaying a screen provided by a native application of the printing apparatus, the printing apparatus comprising:
   a displaying unit;
   a printing unit configured to perform printing processing;
   a hardware key configured to instruct the printing apparatus to display a setting screen for page integration, wherein in either case where the printing apparatus is operating in the web mode or the native mode, the displaying unit displays the setting screen for page integration in response to a user pressing the hardware key;
   a determining unit configured to determine, in response to the user pressing the hardware key, whether the printing apparatus is operating in the web mode or the native mode;
   a requesting unit configured to request, if the determining unit determines that the printing apparatus is operating in the web mode, screen information for displaying the setting screen for page integration from the web server by transmitting identification information of the hardware key and identification information of the printing apparatus to the web server; and
   a receiving unit configured to receive the screen information from the web server,
   wherein if the determining unit determines that the printing apparatus is operating in the web mode, the displaying unit displays the setting screen for page integration, based on the screen information received by the receiving unit, and
   wherein if the determining unit determines that the printing apparatus is operating in the native mode, the display unit displays the setting screen, which is provided by the native application, for page integration.

2. The printing apparatus according to claim 1, wherein the identification information of the printing apparatus is model information indicating a model of the printing apparatus.

3. A method for operating a printing apparatus operable in one of a web mode for displaying a screen provided by a web application of a web server and a native mode for displaying a screen provided by a native application of the printing apparatus, comprising:
   issuing, by a hardware key, an instruction for the printing apparatus to display a setting screen for page integration, wherein in either case where the printing apparatus is operating in the web mode or the native mode, the setting screen for page integration in response to a user pressing the hardware key is displayed;
   determining, in response to the user pressing the hardware key, whether the printing apparatus is operating in the web mode or the native mode;
   requesting, if it is determined that the printing apparatus is operating in the web mode, screen information for displaying the setting screen for page integration from the web server by transmitting identification information of the hardware key and identification information of the printing apparatus to the web server; and
   receiving the screen information from the web server,
   wherein if it is determined that the printing apparatus is operating in the web mode, displaying the setting screen for page integration, based on the screen information received, and
   wherein if it is determined that the printing apparatus is operating in the native mode, displaying the setting screen, which is provided by the native application, for page integration.

4. A non-transitory computer-readable storage medium storing a computer-executable process for causing a computer to perform a method for operating a printing apparatus operable in one of a web mode for displaying a screen provided by a web application of a web server and a native mode for displaying a screen provided by a native application of the printing apparatus, comprising:
   issuing, by a hardware key, an instruction for the printing apparatus to display a setting screen for page integration, wherein in either case where the printing apparatus is operating in the web mode or the native mode, the setting screen for page integration in response to a user pressing the hardware key is displayed;
   determining, in response to the user pressing the hardware key, whether the printing apparatus is operating in the web mode or the native mode;
   requesting, if it is determined that the printing apparatus is operating in the web mode, screen information for displaying the setting screen for page integration from the web server by transmitting identification information of the hardware key and identification information of the printing apparatus to the web server; and
   receiving the screen information from the web server,
   wherein if it is determined that the printing apparatus is operating in the web mode, displaying the setting screen for page integration, based on the screen information received, and
   wherein if it is determined that the printing apparatus is operating in the native mode, displaying the setting screen, which is provided by the native application, for page integration.

* * * * *